US012563383B2

(12) United States Patent
Lei

(10) Patent No.: US 12,563,383 B2
(45) Date of Patent: Feb. 24, 2026

(54) MAPPING A NETWORK ADDRESS OF AN APPLICATION SERVER TO A DATA NETWORK ACCESS IDENTIFIER

(71) Applicant: Tencent Technology (Shenzhen) Company Limited, Shenzhen (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 328 days.

(21) Appl. No.: 18/207,605

(22) Filed: Jun. 8, 2023

(65) Prior Publication Data

US 2023/0319546 A1     Oct. 5, 2023

Related U.S. Application Data

(63) Continuation of application No. PCT/CN2022/132979, filed on Nov. 18, 2022.

(30) Foreign Application Priority Data

Jan. 5, 2022    (CN) .......................... 202210009835.8

(51) Int. Cl.
*H04W 8/26*        (2009.01)
*H04W 72/20*       (2023.01)

(52) U.S. Cl.
CPC ............. *H04W 8/26* (2013.01); *H04W 72/20* (2023.01)

(58) Field of Classification Search
None
See application file for complete search history.

(56) References Cited

FOREIGN PATENT DOCUMENTS

WO        WO-2021092441 A1 *  5/2021  ............. H04L 67/10

* cited by examiner

*Primary Examiner* — Kouroush Mohebbi
(74) *Attorney, Agent, or Firm* — ArentFox Schiff LLP

(57)        ABSTRACT

A communication method includes generating a first signaling message by a core network (CN) entity for interacting with an application function (AF) entity. The first signaling message includes a network address of an application server, the network address of the application server being determined by the CN entity based on a mapping relationship between a data network access identifier of the AF entity and the network address of the application server. The method further includes transmitting the first signaling message to the AF entity, the AF entity corresponding to the application server.

17 Claims, 8 Drawing Sheets

Generate a first signaling message for interacting with an application function entity    S410

Transmit the first signaling message to an application function entity, the application function entity being used for maintaining a network address of an application server    S420

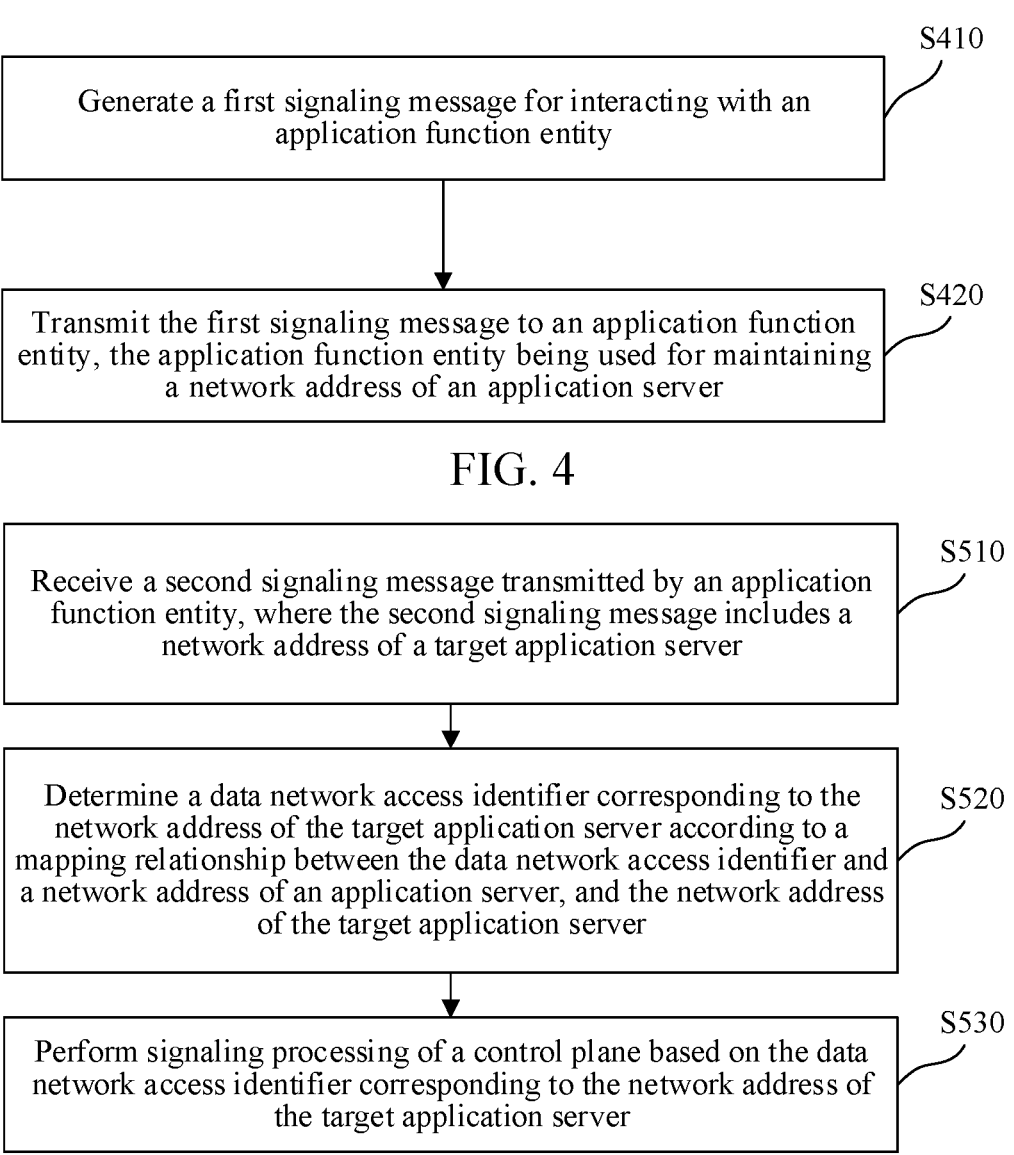

S410

Generate a first signaling message for interacting with an application function entity

S420

Transmit the first signaling message to an application function entity, the application function entity being used for maintaining a network address of an application server

Receive a second signaling message transmitted by an application function entity, where the second signaling message includes a network address of a target application server

S520

Determine a data network access identifier corresponding to the network address of the target application server according to a mapping relationship between the data network access identifier and a network address of an application server, and the network address of the target application server

S530

Perform signaling processing of a control plane based on the data network access identifier corresponding to the network address of the target application server

FIG. 5

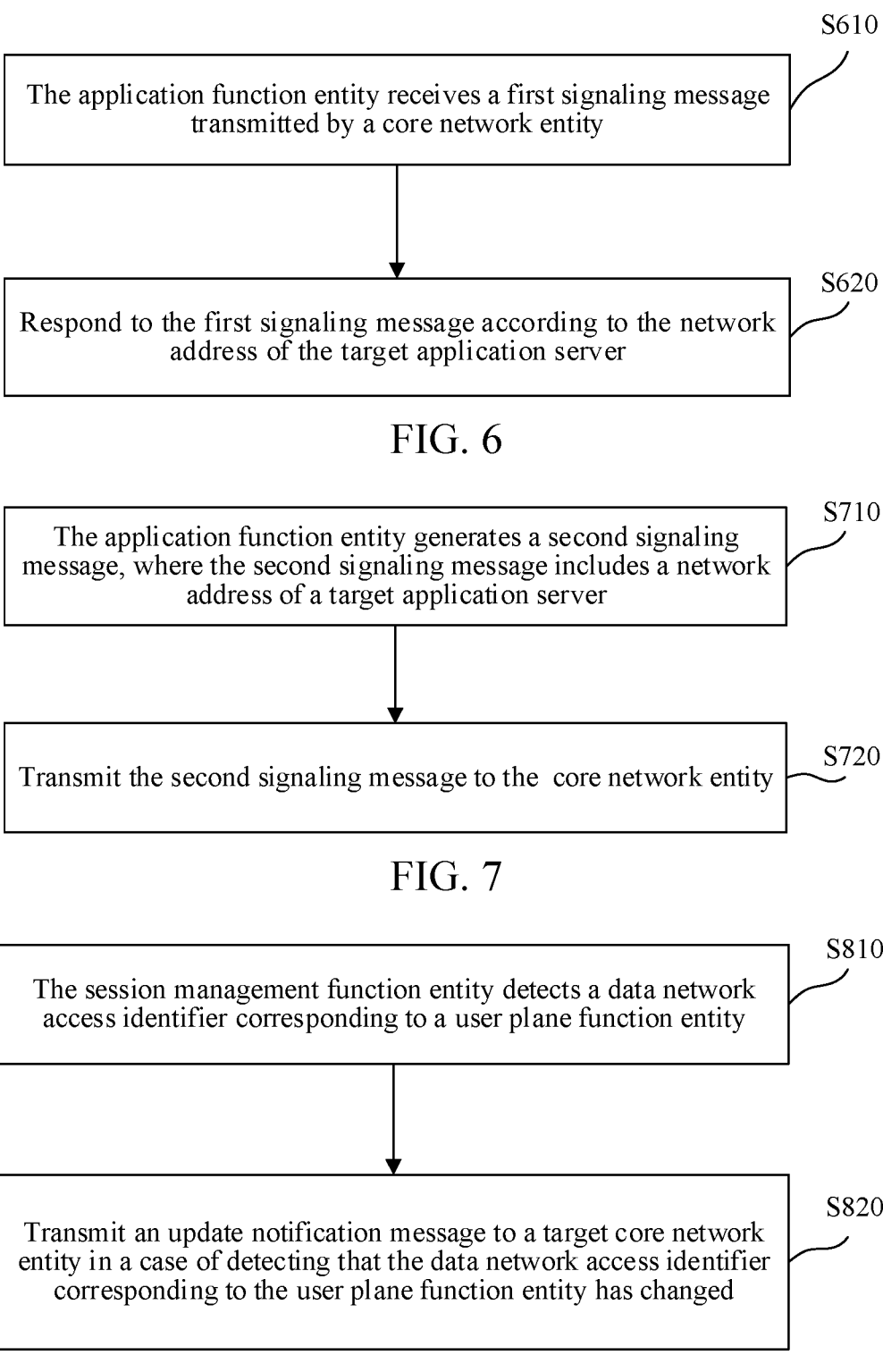

S610

The application function entity receives a first signaling message transmitted by a core network entity

S620

Respond to the first signaling message according to the network address of the target application server

The application function entity generates a second signaling message, where the second signaling message includes a network address of a target application server

S720

Transmit the second signaling message to the core network entity

The session management function entity detects a data network access identifier corresponding to a user plane function entity

S820

Transmit an update notification message to a target core network entity in a case of detecting that the data network access identifier corresponding to the user plane function entity has changed

MAPPING A NETWORK ADDRESS OF AN APPLICATION SERVER TO A DATA NETWORK ACCESS IDENTIFIER

RELATED APPLICATIONS

This application is a continuation of International Application No. PCT/CN2022/132979, filed on Nov. 18, 2022, which claims priority to Chinese Patent Application No. 202210009835.8, filed on Jan. 5, 2022. The disclosures of the prior applications are hereby incorporated by reference in their entirety.

FIELD OF THE TECHNOLOGY

This application relates to the field of computer and communication technologies, including a communication method and apparatus, a computer-readable storage medium, an electronic device, and a program product.

BACKGROUND OF THE DISCLOSURE

A Data Network Access Identifier (DNAI) is an identifier inside a 5G system, and may be used for identifying an Edge Application Server (EAS), but an Application Function (AF) is a network element outside 5G Core (5GC). As a result, it is quite inconvenient to use the identity inside 5GC, causing complicated implementation of the AF.

SUMMARY

Embodiments of this disclosure provide a communication method and apparatus, a computer-readable storage medium, an electronic device, and a computer program product, which can reduce the implementation difficulty of an application function entity and reduce the signaling overhead caused by interacting a data network access identifier between an application function entity and a core network entity.

In an embodiment, a communication method includes generating a first signaling message by a core network (CN) entity for interacting with an application function (AF) entity. The first signaling message includes a network address of an application server, the network address of the application server being determined by the CN entity based on a mapping relationship between a data network access identifier of the AF entity and the network address of the application server. The method further includes transmitting the first signaling message to the AF entity, the AF entity corresponding to the application server.

In an embodiment, a communication apparatus includes processing circuitry configured to generate a first signaling message by a core network (CN) entity for interacting with an application function (AF) entity. The first signaling message includes a network address of an application server, the network address of the application server being determined by the CN entity based on a mapping relationship between a data network access identifier of the AF entity and the network address of the application server. The processing circuitry is further configured to transmit the first signaling message to the AF entity, the AF entity corresponding to the application server.

In an embodiment, a non-transitory computer-readable storage medium stores computer-readable instructions configured to cause processing circuitry to perform a communication method. The communication method includes generating a first signaling message by a core network (CN)

entity for interacting with an application function (AF) entity. The first signaling message includes a network address of an application server, the network address of the application server being determined by the CN entity based on a mapping relationship between a data network access identifier of the AF entity and the network address of the application server. The method further includes transmitting the first signaling message to the AF entity, the AF entity corresponding to the application server.

The technical solutions provided in the embodiments of this disclosure may bring the following beneficial effects:

Since the mapping relationship between the data network access identifier and the network address of the application server is maintained in the core network entity, when the core network entity needs to interact with the application function entity, the network address of the target application server can be determined based on the mapping relationship and the target data network access identifier, and then a first signaling message for interacting with the application function entity is generated. The first signaling message includes the network address of the target application server, so that the application function entity does not need to maintain the data network access identifier, thereby reducing the implementation difficulty of the application function entity and reducing the signaling overhead caused by interacting the data network access identifier between the application function entity and the core network entity.

BRIEF DESCRIPTION OF THE DRAWINGS

FIG. 4 is a flowchart of a communication method according to an embodiment of this disclosure.

FIG. 5 is a flowchart of a communication method according to an embodiment of this disclosure.

FIG. 6 is a flowchart of a communication method according to an embodiment of this disclosure.

FIG. 7 is a flowchart of a communication method according to an embodiment of this disclosure.

FIG. 8 is a flowchart of a communication method according to an embodiment of the disclosure.

DESCRIPTION OF EMBODIMENTS

Exemplary implementations are now described more comprehensively with reference to the accompanying drawings. However, the exemplary implementations may be implemented in various forms, and are not to be understood as being limited to the examples described herein. Instead, the implementations are provided to make this disclosure more thorough and fully convey the idea of the exemplary implementations to a person skilled in the art.

In addition, the described features, structures, or characteristics may be combined in one or more embodiments in any appropriate manner. In the following descriptions, many details are provided to provide a full understanding of the embodiments of this disclosure. However, a person skilled in the art is to be aware that, the technical solutions in this disclosure may be implemented without all detailed features in the embodiments, and one or more specific details may be omitted, or another method, element, apparatus, or step may be used.

The block diagrams shown in the accompanying drawings are merely functional entities and do not necessarily correspond to physically independent entities. That is, the functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned herein means two or more. "And/or" describes an association relationship for describing associated objects and represents that three relationships may exist. For example, A and/or B may represent the following three cases: Only A exists, both A and B exist, and only B exists. A character "/" generally indicates an "or" relationship between the associated objects.

Edge Computing (EC) is to deploy an Application Server (AS) to a position close to User Equipment (UE) to minimize a communication delay between the UE and the AS. Two basic architectures for implementing EC are shown in FIG. 1 and FIG. 2 respectively.

Figures 1, 2:
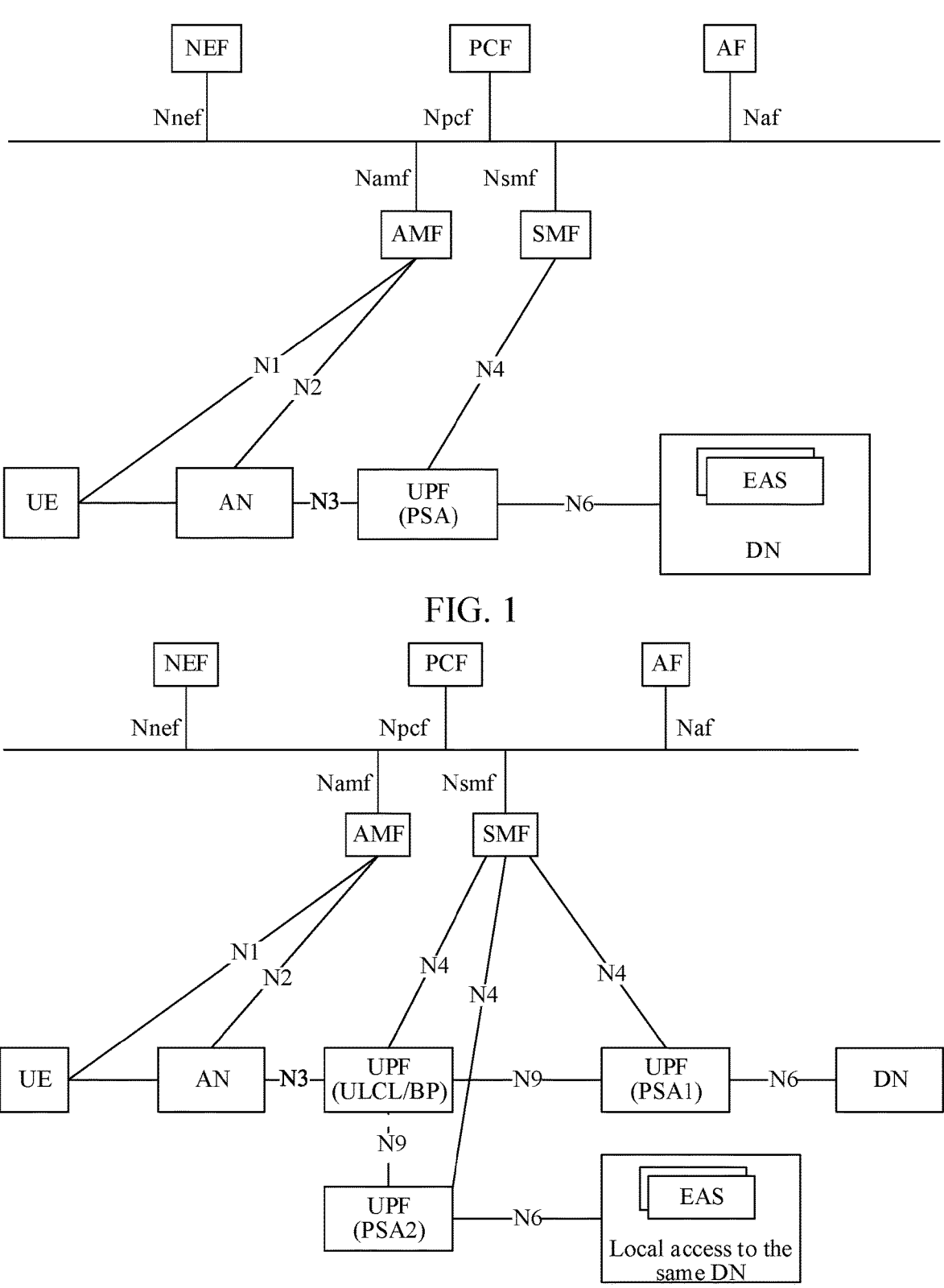
FIG. 1 is a schematic diagram of an EC architecture in the related art.
FIG. 2 is a schematic diagram of another EC architecture in the related art.

In FIG. 1, a User Plane Function (UPF)/PDU Session Anchor ((Protocol Data Unit, PDU) Session Anchor, PSA) is deployed near an Access Network (AN), and an Edge Application Server (EAS) is deployed in a Data Network (DN) connected to the PSA.

In FIG. 2, a UPF/PSA1 is deployed in a central position, an AN Uplink Classifier (UL CL)/Branching Point (BP) is deployed near an AN, and then a UPF/PSA2 near a base station branches to deploy an EAS in the same DN of Local Access connected to the PSA2.

That is, the architecture shown in FIG. 1 does not use a UL CL or BP to access an EAS, and the architecture shown in FIG. 2 uses a UL CL or BP to access an EAS.

In embodiments shown in FIG. 1 and FIG. 2, NEF is the abbreviation of Network Exposure Function, and Nnef refers to an interface through which the NEF provides services. Other network functions (NFs) transmit Nnef service request messages to the NEF through this interface, and the NEF replies to requests or transmits notification service messages through this interface. PCF is the abbreviation of Policy Control Function, and Npcf refers to an interface through which the PCF provides services. Other network functions (NFs) transmit Npcf service request messages to the PCF through this interface, and the PCF replies to requests and transmits notification service messages through this interface. AF is the abbreviation of Application Function, and Naf refers to an interface through which the AF provides services. Other network functions (NFs) transmit Naf messages to the AF through this interface, and the AF replies to requests and transmits notification service messages through this interface. AMF is the abbreviation of Access and Mobility Management Function, and Namf refers to an interface through which the AMF provides services. Other network functions (NFs) transmit Namf messages to the AMF through this interface, and the AMF replies to requests and transmits notification service messages through this interface. SMF is the abbreviation of Session Management Function, and Nsmf refers to an interface through which the SMF provides services. Other network functions (NFs) transmit Nsmf messages to the SMF through this interface, and the SMF replies to requests and transmits notification service messages through this interface. The UE and the AMF interact through an N1 interface, the AMF and the AN interact through an N2 interface, the SMF and the UPF interact through an N4 interface, the AN and the UPF interact through an N3 interface, the UPF and the DN interact through an N6 interface, and the UPF and the UPF interact through an N9 interface.

With the deployment of edge computing in a 5G system, UE mobility and application server redeployment need to be considered during designing of a best deployment solution for edge computing. For example, when the UE moves across a 5G system, the location of the UE may change and require the network and edge to handle the change of the location of the UE, or the UE does not move, but the EAS migrates.

Figure 3:
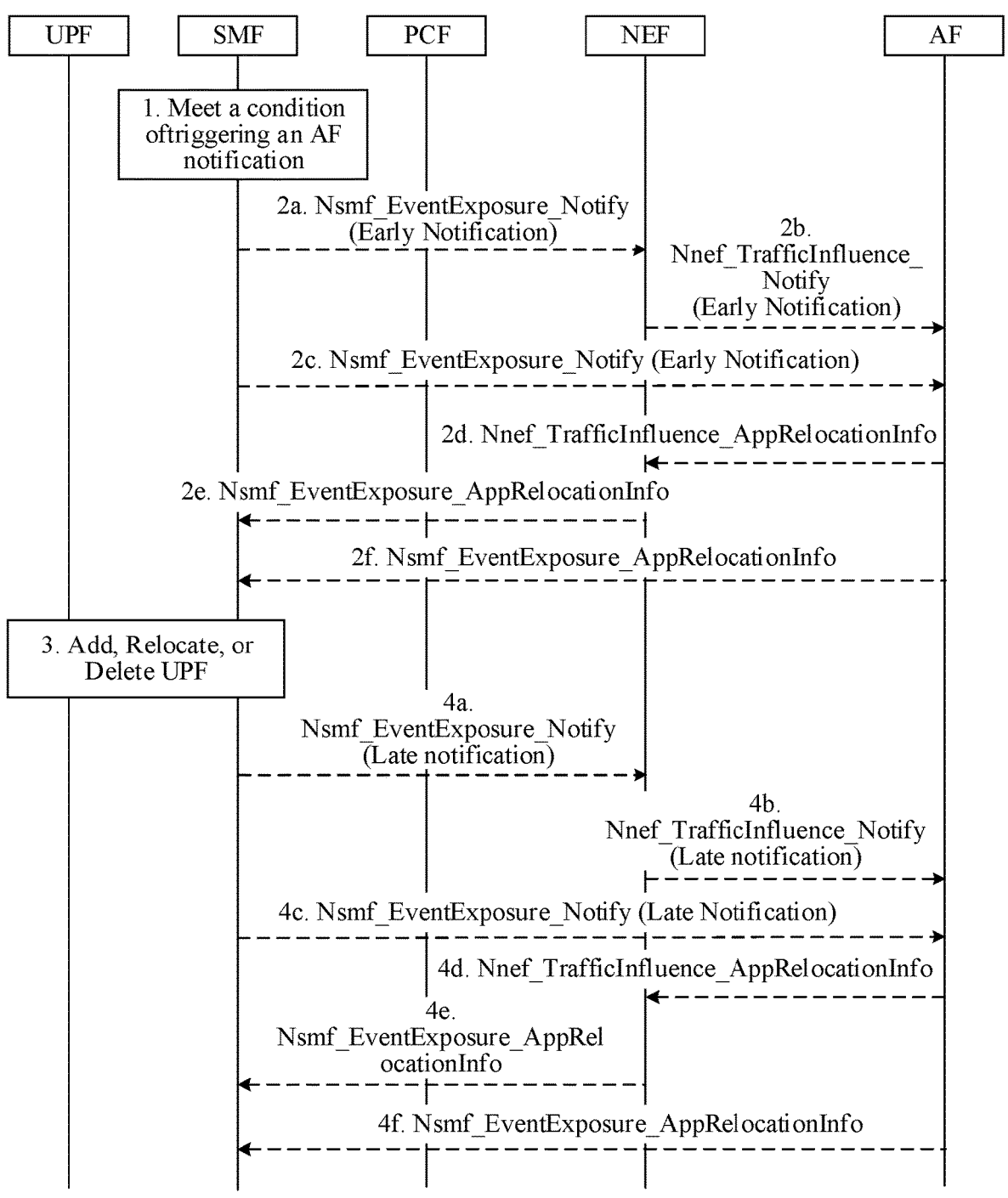
FIG. 3 is a schematic flowchart of notification of user plane management events in the related art.

In order to ensure the continuity of services, a research on UE mobility and application server relocation scenarios is put forward in the related art. For example, an edge application server of services may be changed without changing a Data Network Access Identifier (DN Access Identifier, DNAI). Changing the edge application server when the edge application server of services is crowded or in a disrupted state may result in a change in an EAS IP (Internet Protocol) address. The DNAI is changed according to the location of the UE to better serve the UE. However, in these solutions, interaction is basically performed by using DNAI information. For example, in a process of Notification of User Plane Management Events shown in FIG. 3, the AF is also required to identify the DNAI of the accessed EAS. For example, the process shown in FIG. 3 includes the following steps:

Step 1: Meet a condition of triggering an AF notification. The SMF Transmit a notification to the NF (such as the AF) that subscribes to SMF notifications. Further processing of the SMF notifications depends on the NF that receives the notification, as shown in steps 2a and 2c.

For example, it may be determined that the condition of triggering an AF notification is met when the following conditions are met: a PDU session anchor identified in an AF subscription request has been established or released; the DNAI has changed; and the SMF has received a request for the AF notification and an ongoing PDU session meets the condition of notifying the AF.

Step 2a. If the AF requests an Early Notification through the NEF, the SMF notifies the NEF of a target DNAI of a PDU session by calling an Nsmf_EventExposure_Notify service operation.

Step 2b. When the NEF receives the Nsmf_EventExposure_Notify, the NEF performs information mapping (for example, mapping of an AF service internal ID to an AF service ID provided in notification correlation IDs, or mapping of a Subscription Permanent Identifier (SUPI) to a Generic Public Subscription Identifier (GPSI)) and triggers an appropriate Nnef_TrafficInfluence_Notify message. In this case, step 2c is not suitable, that is, step 2c is not performed.

Step 2c. If the AF requests a direct advance notification, the SMF notifies the AF of the target DNAI of the PDU session by calling the Nsmf_EventExposure_Notify service operation.

Step 2d. The AF responds to Nnef_TrafficInfluence_Notify by immediately calling an Nnef_TrafficInfluence_AppRelocationInfo service operation or after completing any required application relocation in the target DNAI. The AF includes N6 traffic routing details corresponding to the target DNAI. If the AF determines that the application relocation cannot be completed successfully and/or on time, the AF may transmit a negative reply.

Step 2e. When the NEF receives the Nnef_TrafficInfluence_AppRelocationInfo, the NEF triggers a corresponding Nsmf_EventExposure_AppRelocationInfo message.

Step 2f. The AF responds to the Nsmf_EventExposure_Notify by immediately calling an Nsmf_Event-Exposure_AppRelocationInfo service operation or after completing any required application relocation in the target DNAI. The AF includes N6 traffic routing details corresponding to the target DNAI. If the AF determines that the application relocation cannot be successfully completed on time, the AF may transmit a negative reply.

Step 3: The SMF forces to change the DNAI or add, change or delete the UPF.

If runtime coordination between the 5G core network and the AF is started based on a local configuration, the SMF may wait for the response of the AF to an advance notification prior to this step according to an indication of "AF expected confirmation" included in the AF subscription to SMF event. The SMF does not perform this step until it receives a positive response from the AF.

Step 4a. If the AF requests a Late Notification through the NEF, the SMF notifies the NEF of the target DNAI of the PDU session by calling the Nsmf_EventExposure_Notify service operation.

If runtime coordination between the 5G core network and the AF is started based on a local configuration, the SMF may transmit a late notification and wait for a positive response from the AF before activating a new uplink path according to the "AF reply" indication included in the AF subscription to SMF event.

Step 4b. When the NEF receives the Nsmf_EventExposure_Notify, the NEF triggers an appropriate Nnef_EventExposure_Notify message according to information mapping (for example, mapping of an AF service internal ID to an AF service ID provided in notification correlation IDs, or mapping of a SUPI to a GPSI). In this case, step 4c is not suitable, that is, step 4c is not performed.

Step 4c. If the AF requests a direct late notification, the SMF notifies the AF of the target DNAI of the PDU session by calling the Nsmf_EventExposure_Notify service operation.

Step 4d. The AF responds to Nnef_TrafficInfluence_Notify by immediately calling the Nnef_TrafficInfluence_ AppRelocationInfo service operation or after completing any required application relocation in the target DNAI. The AF includes N6 traffic routing details corresponding to the target DNAI. If the AF determines that the application relocation cannot be successfully completed on time, the AF may transmit a negative reply.

Step 4e. When the NEF receives the Nnef_TrafficInfluence_AppRelocationInfo, the NEF triggers the corresponding Nsmf_EventExposure_AppRelocationInfo message.

Step 4f The AF responds to the Nsmf_EventExposure_Notify by immediately calling the Nsmf_EventExposure_AppRelocationInfo service operation or after completing any required application relocation in the target DNAI. The AF includes N6 traffic routing details corresponding to the target DNAI. If the AF determines that the application relocation cannot be successfully completed on time, the AF may transmit a negative reply.

It can be seen that in the related art, the AF needs to maintain DNAI information, and the SMF further needs to notify the AF when the UPF side changes the DNAI information. The DNAI is an identity inside a 5G system, but the AF is a network element outside 5GC (5G Core). As a result, it is quite inconvenient to use the identity inside 5GC, causing complicated implementation of the AF. After the DNAI information changes, 5GC further needs to synchronize with the AF, which brings an extra signaling overhead.

For the foregoing problems, the embodiments of this disclosure provide a new communication solution, so that the application function entity does not need to maintain the data network access identifier, thereby reducing the implementation difficulty of the application function entity, and reducing the signaling overhead caused by interacting the data network access identifier between the application function entity and the core network entity.

Implementation details of the technical solutions of the embodiments of this disclosure are described below in detail.

FIG. 4 is a flowchart of a communication method according to an embodiment of this disclosure. The communication method may be performed by a core network entity, and the core network entity may be a PCF or NEF. Referring to FIG. 4, the communication method includes at least S410 to S420, which are described in detail as follows:

S410. The core network entity generates a first signaling message for interacting with an application function entity. For example, a first signaling message is generated by a core network (CN) entity for interacting with an application function (AF) entity. The first signaling message comprising a network address of an application server, where the network address of the application server is determined by the CN entity based on a mapping relationship between a data network access identifier of the AF entity and the network address of the application server.

The first signaling message includes a network address of a target application server. The network address of the target application server is determined by the core network entity based on a mapping relationship and a target data network access identifier. The mapping relationship refers to a relationship between a data network access identifier and a network address of an application server, and the target data network access identifier is a data network access identifier that needs to be notified to the application function entity.

In an embodiment of this disclosure, the mapping relationship between the data network access identifier and the network address of the application server is maintained by a core network entity, namely, a PCF or NEF. For example, the mapping relationship may be a one-to-one mapping relationship between the data network access identifier and the network address of the application server; or a mapping relationship between the data network access identifier and a network address segment of the application server.

In an embodiment of this disclosure, the PCF or NEF may detect a data network access identifier corresponding to a user plane function entity periodically or in real time to determine whether the data network access identifier has changed. If the PCF or NEF determines that the data network access identifier corresponding to the user plane function entity has changed, a mapping relationship between the data network access identifier and a network address of an application server corresponding to the user plane function entity may be updated according to the changed data network access identifier. For example, if parameters of a UPF have changed, the UPF has been added, or the UPF has been deleted, a data network access identifier corresponding to the UPF also changes. In this case, a mapping relationship between the data network access identifier and a network address of an application server corresponding to the UPF needs to be updated.

In some embodiments, since a session management function entity SMF may grasp the change of data network access identifier information caused by the UPF and other reasons, the SMF may transmit an update notification message to the PCF or NEF after detecting that the data network access identifier corresponding to the user plane function entity has changed, to notify the PCF or NEF of the change of the data network access identifier corresponding to the user plane function entity.

In an embodiment of this disclosure, if the PCF or NEF can detect the change of the data network access identifier corresponding to the maintained network address of the application server, the mapping relationship between the data network access identifier and the network address of the application server may be updated according to the changed data, and then the mapping relationship may be updated in time to ensure the accuracy of the mapping relationship.

S420. Transmit the first signaling message to the application function entity, the application function entity being used for maintaining a network address of an application server. For example, the first signaling message is transmitted to the AF entity, where the AF entity corresponds to the application server.

Herein, after receiving the first signaling message transmitted by the core network entity, the application function entity may parse the first signaling message to obtain the network address of the target application server, and then maintain the network address of the target application server.

According to the technical solution of the embodiment shown in FIG. 4, the core network entity (namely, the PCF or NEF) can perform signaling interaction with the application function entity without carrying the data network access identifier, so that the application function entity does not need to maintain the data network access identifier, thereby reducing the implementation difficulty of the application function entity and reducing the signaling overhead caused by interacting the data network access identifier between the application function entity and the core network entity.

FIG. 5 is a flowchart of a communication method according to an embodiment of this disclosure. The communication method may be performed by a core network entity, and the core network entity may be a PCF or NEF. Referring to FIG. 5, the communication method includes at least S510 to S530, which are described in detail as follows:

S510. Receive a second signaling message transmitted by an application function entity, where the second signaling message includes a network address of a target application server.

In some embodiments, the application function entity may generate the second signaling message when needing to perform signaling interaction with the core network entity. The second signaling message includes the network address of the target application server, and the target application server mentioned herein is specified application server.

S520. is Determine a data network access identifier corresponding to the network address of the target application server according to a mapping relationship between the data network access identifier and a network address of an application server, and the network address of the target application server.

In some embodiments, the mapping relationship may be a one-to-one mapping relationship between the data network access identifier and the network address of the application server; or a mapping relationship between the data network access identifier and a network address segment of the application server.

S530. Perform signaling processing of a control plane based on the data network access identifier corresponding to the network address of the target application server.

According to the technical solution of the embodiment shown in FIG. 5, an AF can perform signaling interaction with the core network entity (namely, the PCF or NEF) without carrying the data network access identifier, so that the application function entity does not need to maintain the data network access identifier, reducing the implementation difficulty of the application function entity, and reducing the signaling overhead caused by interacting the data network access identifier between the application function entity and the core network entity.

FIG. 4 and FIG. 5 illustrate the technical solutions of the embodiments of this disclosure from the perspective of the core network entity (namely, the PCF or NEF), and the implementation details of the technical solutions of the embodiments of this disclosure are described from the perspective of the AF with reference to FIG. 6 and FIG. 7 below:

FIG. 6 is a flowchart of a communication method of an embodiment of this disclosure. The communication method may be performed by an application function entity. Referring to FIG. 6, the communication method includes at least S610 to S620, which are described in detail as follows:

S610. An application function entity receives a first signaling message transmitted by a core network entity.

The first signaling message includes a network address of a target application server. The network address of the target application server is determined by the core network entity based on a mapping relationship between a data network access identifier and a network address of an application server and a target data network access identifier. The target data network access identifier is a data network access identifier that needs to be notified to the application function entity.

In some embodiments, the mapping relationship may be a one-to-one mapping relationship between the data network access identifier and the network address of the application server; or a mapping relationship between the data network access identifier and a network address segment of the application server.

S620. Respond to the first signaling message according to the network address of the target application server.

According to the technical solution of the embodiment shown in FIG. 6, the core network entity (namely, the PCF or NEF) can perform signaling interaction with the application function entity without carrying the data network access identifier, so that the application function entity does not need to maintain the data network access identifier, thereby reducing the implementation difficulty of the application function entity and reducing the signaling overhead caused by interacting the data network access identifier between the application function entity and the core network entity.

FIG. 7 is a flowchart of a communication method according to an embodiment of this disclosure. The communication method may be performed by an application function entity. Referring to FIG. 7, the communication method includes at least S710 to S720, which are described in detail as follows:

S710. The application function entity generates a second signaling message, where the second signaling message includes a network address of a target application server.

For example, the application function entity may generate the second signaling message when needing to perform signaling interaction with the core network entity. The second signaling message includes the network address of the target application server.

S720. Transmit the second signaling message to the core network entity.

In actual application, after receiving the second signaling message transmitted by the application function entity, the core network entity determines a data network access identifier corresponding to the network address of the target application server according to the mapping relationship and the network address of the target application server, and performs signaling processing of a control plane based on the data network access identifier corresponding to the network address of the target application server.

According to the technical solution of the embodiment shown in FIG. 7, an AF can perform signaling interaction with the core network entity (namely, the PCF or NEF) without carrying the data network access identifier, so that the application function entity does not need to maintain the data network access identifier, reducing the implementation difficulty of the application function entity, and reducing the signaling overhead caused by interacting the data network access identifier between the application function entity and the core network entity.

The technical solutions of the embodiments of this disclosure are described below from the perspective of a session management function with reference to FIG. 8:

FIG. 8 is a flowchart of a communication method of an embodiment of this disclosure. The communication method may be performed by a session management function entity. Referring to FIG. 8, the communication method includes at least S810 to S820, which are described in detail as follows:

S810. The session management function entity detects a data network access identifier corresponding to a user plane function entity.

In some embodiments, since the session management function entity may grasp the change of data network access identifier information caused by the UPF and other reasons, the SMF may detect whether the data network access identifier corresponding to the UPF has changed. In actual application, the session management function entity may periodically detect whether the data network access identifier has changed or detect in real time whether the data network access identifier has changed. If it is detected that the data network access identifier corresponding to the user plane function entity has changed, an update notification message is transmitted to the PCF or NEF to notify the PCF or NEF of the change of the data network access identifier corresponding to the user plane function entity.

S820. Transmit an update notification message to a target core network entity in a case of detecting that the data network access identifier corresponding to the user plane function entity has changed.

Herein, the update notification message is used for triggering the target core network entity (namely, the specified core network entity) to update the mapping relationship between the data network access identifier and the network address of the application server corresponding to the user plane function entity according to the changed data network access identifier.

According to the technical solution of the embodiment shown in FIG. 8, the SMF can trigger the core network entity to update the mapping relationship between the data network access identifier and the network address of the application server corresponding to the user plane function entity in time after detecting that the data network access identifier corresponding to the user plane function entity has changed, thereby ensuring the accuracy of the mapping relationship.

To sum up, the technical solutions of the embodiments of this disclosure are mainly in an interaction mechanism between the AF and 5GC, and a mapping between the DNAI and an IP address or IP address segment of the application server is introduced to a 5GC edge node (such as a PCF or NEF), so that the AF only needs to maintain the IP address or IP address segment of a specific server, but does not need to maintain a DNAI list of a specific service. When DNAI configuration information inside 5GC has changed, the corresponding update only needs to reach the 5GC edge node such as the PCF or NEF, and needs no interaction with the AF.

Figure 9:
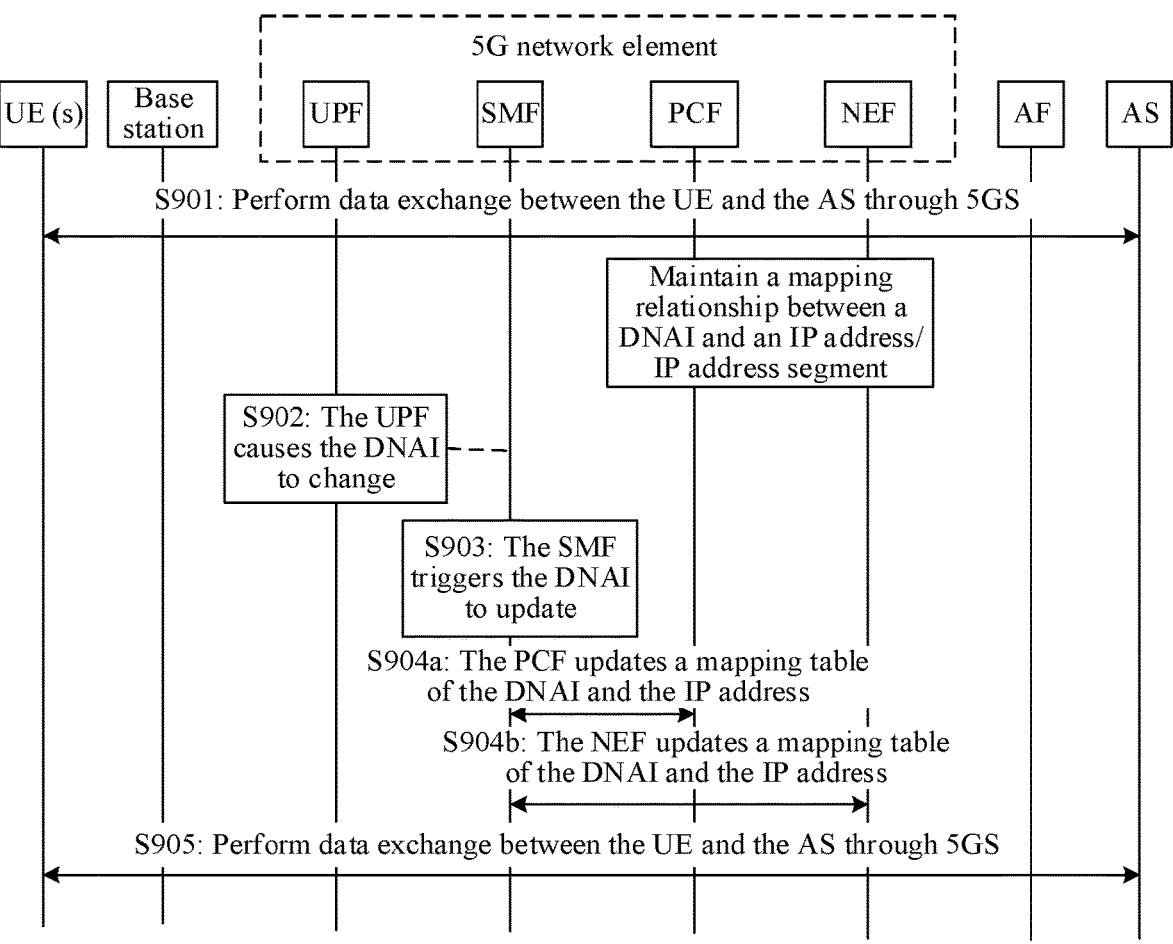
FIG. 9 is an interactive flowchart of entities according to an embodiment of this this disclosure.

An exemplary interaction process, as shown in FIG. 9, includes the following steps:

S901. Perform data exchange between the UE and the AS through 5GS.

For example, data exchange is performed between the UE and the AS through a PDU session established in 5GS.

The PCF or NEF maintains a mapping relationship between a DNAI and an IP address or IP address pool. Since a correspondence between the IP address/IP address pool and the AS does not change easily compared with a correspondence between a DNAI and an IP address/IP address pool, the AF can maintain only the IP address or IP address pool on the premise that the PCF or NEF maintains the mapping relationship between the DNAI and the IP address or IP address pool.

S902. A change of the UPF leads to a change of the DNAI.

For example, parameters of the UPF have changed, the UPF has been added, or the UPF has been deleted.

S903. The SMF triggers an update process of the mapping relationship. The SMF is a control plane network element in which the UPF is configured, and therefore, the SMF may grasp the change of DNAI information caused by the UPF and other reasons.

S904*a*. The PCF updates a mapping table of the DNAI and the IP address. S904*b*. The PCF updates a mapping table of the DNAI and the IP address.

At least one of the PCF and NEF may maintain a mapping table of the DNAI and the IP address.

S905. Perform data exchange between the UE and the AS through 5GS.

To support the technical solutions of the embodiments of this disclosure, the PCF or NEF needs to be correspondingly enhanced to support maintenance of a correspondence between the DNAI and the IP address/IP address pool. These information may be obtained from the SMF and related network elements and signaling, and the related network elements include but are not limited to AMF, Network Data Analytics Function (NWDAF), and the like.

According to the technical solutions of the foregoing embodiments of this disclosure, the application function entity does not need to maintain the data network access identifier, thereby reducing the implementation difficulty of the application function entity, reducing the signaling overhead caused by interacting the data network access identifier between the application function entity and the core network entity, and also supporting flexible EAS access.

The following describes the apparatus embodiments of this disclosure, which may be used for performing the communication method in the foregoing embodiments of this disclosure. For details not disclosed in the apparatus embodiments of this disclosure, refer to the foregoing communication method embodiments of this disclosure.

Figure 10:
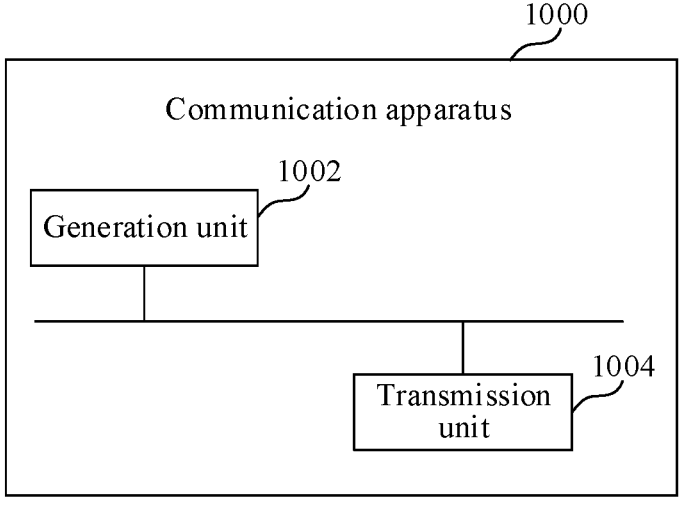
FIG. 10 is a block diagram of a communication apparatus according to an embodiment of this disclosure.

FIG. 10 is a block diagram of a communication apparatus according to an embodiment of this disclosure. The communication apparatus may be disposed in a core network entity, and a mapping relationship between a data network access identifier and a network address of an application server is maintained in the core network entity.

Referring to FIG. 10, the communication apparatus 1000 according to an e embodiment of this disclosure includes a generation unit 1002 and a transmission unit 1004.

The generation unit 1002 is configured to generate a first signaling message for interacting with an application function entity, the first signaling message including a network address of a target application server, the network address of the target application server being determined by the core network entity based on the mapping relationship and a target data network access identifier, the target data network access identifier being a data network access identifier that needs to be notified to the application function entity.

The transmission unit 1004 is configured to transmit the first signaling message to the application function entity, the application function entity being used for maintaining a network address of an application server.

Herein, after receiving the first signaling message transmitted by the core network entity, the application function entity may parse the first signaling message to obtain the network address of the target application server, and then maintain the network address of the target application server.

In some embodiments of this disclosure, the communication apparatus 1000 further includes: an update unit, configured to update, if it is determined that a data network access identifier corresponding to a user plane function entity has changed, a mapping relationship between the data network access identifier and a network address of an application server corresponding to the user plane function entity according to the changed data network access identifier.

In some embodiments of this disclosure, the update unit is further configured to: determine, in a case that an update notification message transmitted by a session management function entity is received, that the data network access identifier corresponding to the user plane function entity has changed, where the update notification message is transmitted by the session management function entity after detecting that the data network access identifier corresponding to the user plane function entity has changed.

In some embodiments of this disclosure, the communication apparatus 1000 further includes an update unit, configured to update, in a case that a data network access identifier corresponding to the maintained network address of the application server has changed, a mapping relationship between the data network access identifier and the network address of the application server.

In some embodiments of this disclosure, the mapping relationship includes at least one of the following: a one-to-one mapping relationship between the data network access identifier and the network address of the application server; and a mapping relationship between the data network access identifier and a network address segment of the application server.

In some embodiments of this disclosure, the communication apparatus 1000 further includes: a receiving unit, configured to receive a second signaling message transmitted by an application function entity, where the second signaling message includes a network address of a target application server; a determining unit, configured to determine a data network access identifier corresponding to the network address of the target application server according to the mapping relationship and the network address of the target application server; and a processing unit, configured to perform signaling processing of a control plane based on the data network access identifier corresponding to the network address of the target application server.

In some embodiments of this disclosure, based on the foregoing solution, the communication apparatus 1000 is disposed in a policy control function entity or a network exposure function entity.

Figure 11:
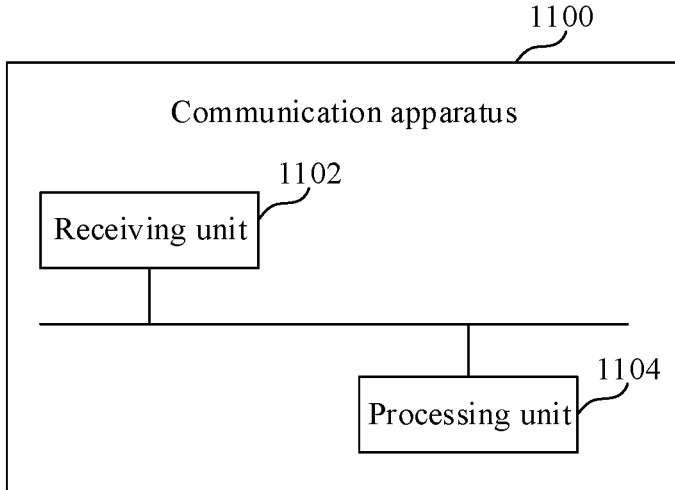
FIG. 11 is a block diagram of a communication apparatus according to an embodiment of this disclosure.

FIG. 11 is a block diagram of a communication apparatus according to an embodiment of this disclosure. The communication apparatus may be disposed in an application function entity.

Referring to FIG. 11, the communication apparatus 1100 according to an embodiment of this disclosure includes a receiving unit 1102 and a processing unit 1104.

The receiving unit 1102 is configured to receive a first signaling message transmitted by a core network entity, the first signaling message including a network address of a target application server, the network address of the target application server being determined by the core network entity based on a mapping relationship between a data network access identifier and a network address of an application server and a target data network access identifier, the target data network access identifier being a data network access identifier that needs to be notified to the application function entity. The processing unit 1104 is configured to respond to the first signaling message according to the network address of the target application server.

In some embodiments of this disclosure, the communication apparatus 1100 further includes: a generation unit, configured to generate a second signaling message, where the second signaling message includes a network address of a target application server; a transmission unit, configured to transmit the second signaling message to the core network entity, so that the core network entity determines a data network access identifier corresponding to the network address of the target application server according to the mapping relationship and the network address of the target application server, and performs signaling processing of a control plane based on the data network access identifier corresponding to the network address of the target application server.

Figure 12:
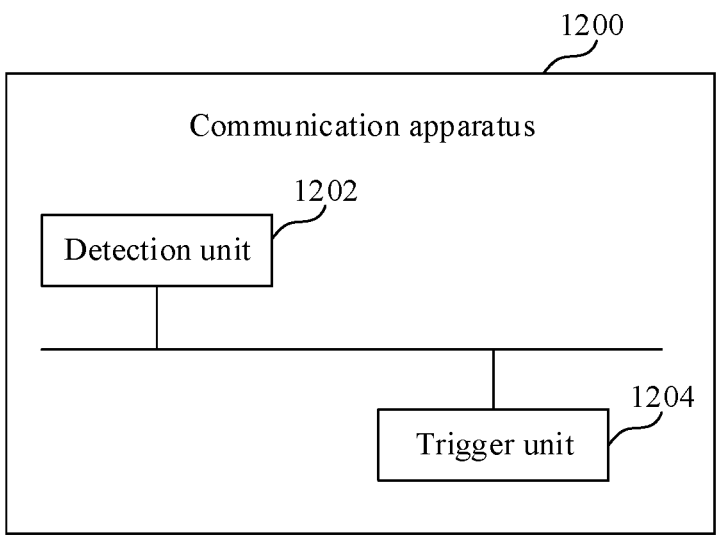
FIG. 12 is a block diagram of a communication apparatus according to an embodiment of this disclosure.

FIG. 12 is a block diagram of a communication apparatus according to an embodiment of this disclosure. The communication apparatus may be disposed in a session management function entity.

Referring to FIG. 12, the communication apparatus 1200 according to an embodiment of this disclosure includes a detection unit 1202 and a trigger unit 1204.

The detection unit 1202 is configured to detect a data network access identifier corresponding to a user plane function entity. The trigger unit 1204 is configured to transmit an update notification message to a target core network entity in a case that it is detected that the data network access identifier corresponding to the user plane function entity has changed, the update notification message being used for triggering the target core network entity to update a mapping relationship between the data network access identifier and a network address of an application server corresponding to the user plane function entity according to the changed data network access identifier.

Figure 13:
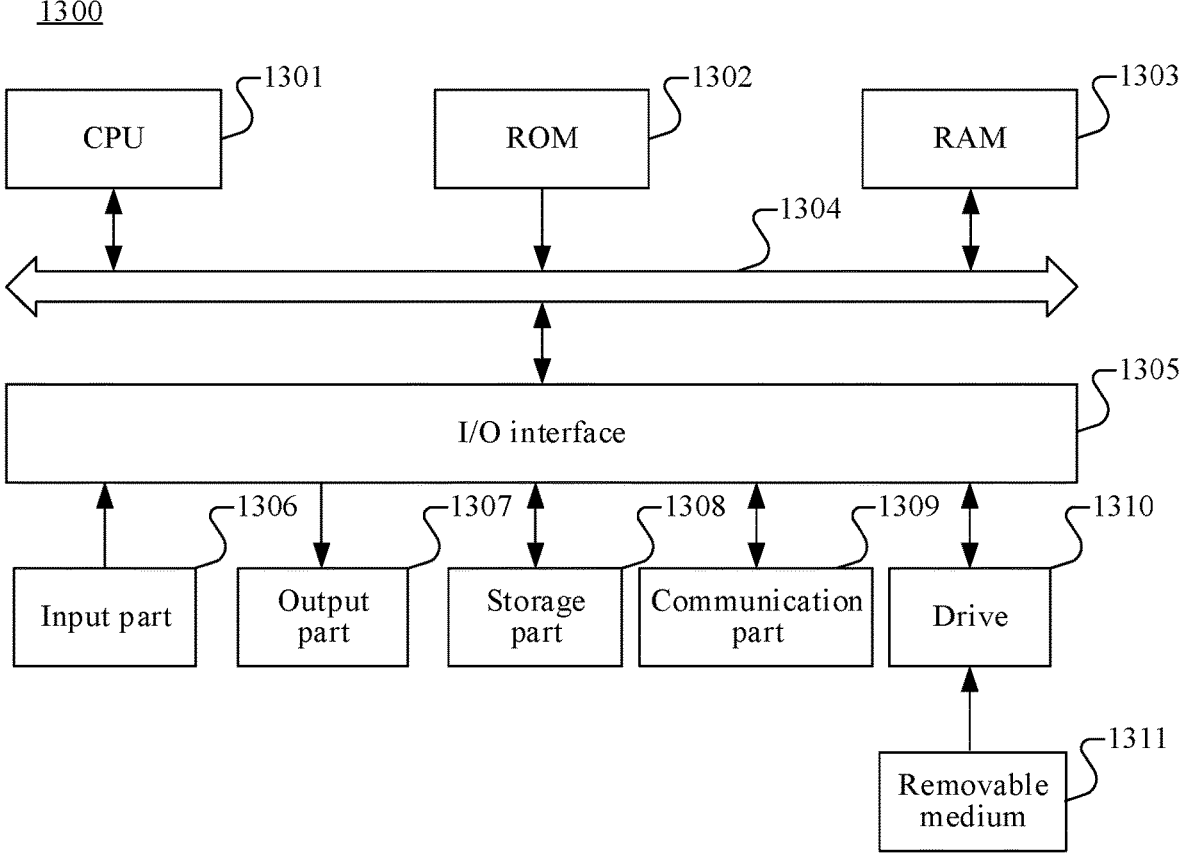
FIG. 13 is a schematic structural diagram of an electronic device according to an embodiment of this disclosure.

FIG. 13 is a schematic structural diagram of a computer system adapted to implement an electronic device according to an embodiment of this disclosure. A computer system 1300 of the electronic device shown in FIG. 13 is merely an example, and does not constitute any limitation on functions and use ranges of the embodiments of this disclosure.

As shown in FIG. 13, the computer system 1300 includes a central processing unit (CPU) 1301, which may execute various appropriate actions and processing according to a program stored in a read-only memory (ROM) 1302 or a program loaded from a storage part 1308 to a random access memory (RAM) 1303, for example, perform the method described in the foregoing embodiments. The RAM 1303 further stores various programs and data required for operating the system. The CPU 1301, the ROM 1302, and the RAM 1303 are connected to each other through a bus 1304. An input/output (I/O) interface 1305 is also connected to the bus 1304.

The following components are connected to the I/O interface 1305: an input part 1306 including a keyboard, a mouse, or the like, an output part 1307 including a cathode ray tube (CRT), a liquid crystal display (LCD), a speaker, or the like, a storage part 1308 including a hard disk, or the like, and a communication part 1309 including a network interface card such as a local area network (LAN) card or a modem. The communication part 1309 performs communication processing by using a network such as the Internet. A drive 1310 is also connected to the I/O interface 1305 as required. A removable medium 1311, such as a disk, an optical disc, a magneto-optical disc, or a semiconductor memory, is installed on the drive 1310 as required, so that a computer program read from the removable medium 1311 is installed in the storage part 1308 as required.

Particularly, according to an embodiment of this disclosure, the processes described above by referring to the flowcharts may be implemented as computer software programs. For example, an embodiment of this disclosure includes a computer program product. The computer program product includes a computer-readable program stored in a computer-readable medium. The computer program includes a computer program used for performing a method shown in the flowchart. In such an embodiment, the computer program may be downloaded and installed from a network through the communication part 1309, and/or installed from the removable medium 1311. When the computer program is executed by the CPU 1301, the various functions defined in the system of this disclosure are executed.

The computer-readable medium shown in the embodiments of this disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. An example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, an apparatus, or a device. In this disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The computer-readable program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of this disclosure may be implemented in a software manner, or may be implemented in a hardware manner, and the unit described can also be set in a processor. Names of the units do not constitute a limitation on the units in a specific case.

This disclosure further provides a computer-readable medium. The computer-readable medium may be included in the electronic device described in the foregoing embodiments, or may exist alone and is not assembled in the electronic device. The computer-readable storage medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

After considering the specification and practicing the disclosed embodiments, a person skilled in the art may easily conceive of other implementations of this disclosure. This disclosure is intended to cover any variation, use or adaptive change of this disclosure. Such variation, use or adaptive change follows the general principles of this disclosure, and includes well-known knowledge and conventional technical means in the art that are not disclosed in this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A communication method, comprising:

generating a first signaling message by a core network (CN) entity for interacting with an application function (AF) entity, the first signaling message comprising a network address of an application server, the network address of the application server being determined by the CN entity based on a mapping relationship between a data network access identifier corresponding to a user plane function entity and the network address of the application server;

transmitting the first signaling message to the AF entity, the AF entity corresponding to the application server; and updating, in response to a change of the data network access identifier corresponding to the user plane function entity, the mapping relationship between the data network access identifier corresponding to the user plane function entity and the network address of the application server according to the changed data network access identifier.

2. The communication method according to claim 1, further comprising:

determining that the data network access identifier corresponding to the user plane function entity has changed, wherein the user plane function entity corresponds to the application server.

3. The communication method according to claim 2, further comprising:

determining, in response to receiving an update notification message transmitted by a session management function entity, that the data network access identifier corresponding to the user plane function entity has changed, wherein the update notification message is transmitted by the session management function entity after detecting that the data network access identifier corresponding to the user plane function entity has changed.

4. The communication method according to claim 1, wherein the mapping relationship comprises at least one of:

a one-to-one mapping relationship between the data network access identifier corresponding to the user plane function entity and the network address of the application server; or a mapping relationship between the data network access identifier corresponding to the user plane function entity and a network address segment of the application server.

5. The communication method according to claim 1, further comprising:

receiving a second signaling message transmitted by the AF entity, wherein the second signaling message comprises the network address of the application server;

determining the data network access identifier corresponding to the user plane function entity based on the network address of the application server according to the mapping relationship; and performing signaling processing of a control plane based on the data network access identifier corresponding to the user plane function entity determined based on the network address of the application server.

6. The communication method according to claim 1, wherein the CN entity is a policy control function (PCF) entity or a network exposure function (NEF) entity in a 5G network.

7. A communication apparatus, comprising:

processing circuitry configured to generate a first signaling message by a core network (CN) entity for interacting with an application function (AF) entity, the first signaling message comprising a network address of an application server, the network address of the application server being determined by the CN entity based on a mapping relationship between a data network access identifier corresponding to a user plane function entity and the network address of the application server;

transmit the first signaling message to the AF entity corresponding to the application server; and update, in response to a change of the data network access identifier of the user plane function entity, the mapping relationship between the data network access identifier of the user plane function entity and the network address of the application server according to the changed data network access identifier.

8. The communication apparatus according to claim 7, wherein the processing circuitry is further configured to:

determine that the data network access identifier corresponding to the user plane function entity has changed, wherein the user plane function entity corresponds to the application server.

9. The communication apparatus according to claim 8, wherein the processing circuitry is further configured to:

determine, in response to receiving an update notification message transmitted by a session management function entity, that the data network access identifier corresponding to the user plane function entity has changed, wherein the update notification message is transmitted by the session management function entity after detecting that the data network access identifier corresponding to the user plane function entity has changed.

10. The communication apparatus according to claim 7, wherein the mapping relationship comprises at least one of:

a one-to-one mapping relationship between the data network access identifier corresponding to the user plane function entity and the network address of the application server; or a mapping relationship between the data network access identifier corresponding to the user plane function entity and a network address segment of the application server.

11. The communication apparatus according to claim 7, further comprising:

receive a second signaling message transmitted by the AF entity, wherein the second signaling message comprises the network address of the application server;

determine the data network access identifier corresponding to the user plane function entity based on the network address of the application server according to the mapping relationship; and perform signaling processing of a control plane based on the data network access identifier corresponding to the user plane function entity determined based on the network address of the application server.

12. The communication apparatus according to claim 7, wherein the communication apparatus is a policy control function (PCF) entity or a network exposure function (NEF) entity in a 5G network.

13. A non-transitory computer-readable storage medium storing computer-readable instructions thereon, which, when executed by processing circuitry, cause the processing circuitry to perform a communication method comprising:

generating a first signaling message by a core network (CN) entity for interacting with an application function (AF) entity, the first signaling message comprising a network address of an application server, the network address of the application server being determined by the CN entity based on a mapping relationship between a data network access identifier corresponding to a user plane function entity and the network address of the application server;

transmitting the first signaling message to the AF entity, the AF entity corresponding to the application server; and updating, in response to a change of the data network access identifier corresponding to the user plane function entity, the mapping relationship between the data network access identifier corresponding to the user plane function entity and the network address of the application server according to the changed data network access identifier.

14. The non-transitory computer-readable storage medium according to claim 13, wherein the communication method further comprises:

determining that the data network access identifier corresponding to the user plane function entity has changed, wherein the user plane function entity corresponds to the application server.

15. The non-transitory computer-readable storage medium according to claim 14, wherein the communication method further comprises:

determining, in response to receiving an update notification message transmitted by a session management function entity, that the data network access identifier corresponding to the user plane function entity has changed, and the update notification message is transmitted by the session management function entity after detecting that the data network access identifier corresponding to the user plane function entity has changed.

16. The non-transitory computer-readable storage medium according to claim 13, wherein the mapping relationship comprises at least one of:

a one-to-one mapping relationship between the data network access identifier corresponding to the user plane function entity and the network address of the application server; or a mapping relationship between the data network access identifier corresponding to the user plane function entity and a network address segment of the application server.

17. The non-transitory computer-readable storage medium according to claim 13, wherein the communication method further comprises:

receiving a second signaling message transmitted by the AF entity, wherein the second signaling message comprises the network address of the application server;

determining the data network access identifier corresponding to the user plane function entity based on the network address of the application server according to the mapping relationship; and performing signaling processing of a control plane based on the data network access identifier corresponding to the user plane function entity determined based on the network address of the application server.

* * * * *